(No Model.)

A. J. DOTY.
OYSTER COOKER.

No. 434,822. Patented Aug. 19, 1890.

WITNESSES =
W. J. Morgan
Wilfred P. Caul

INVENTOR =
Albert J. Doty
By A. P. Thayer
atty.

United States Patent Office.

ALBERT J. DOTY, OF NEW YORK, N. Y.

OYSTER-COOKER.

SPECIFICATION forming part of Letters Patent No. 434,822, dated August 19, 1890.

Application filed January 3, 1890. Serial No. 335,778. (No model.)

*To all whom it may concern:*

Be it known that I, ALBERT J. DOTY, a citizen of the United States, and a resident of New York city, in the county and State of New York, have invented new and useful Improvements in Oyster-Cookers, of which the following is a specification.

My invention relates to stew-pans, such as are more particularly used for cooking oysters, and it consists of such a pan mounted over a gas-flame on cranked trunnions for dumping out the cooked oysters and at the same time swinging the pan away from over the fire, so as not to be subject to the heat when not in use. It also consists of a closed jacket attached to the pan and charged with a liquid substance to equalize the heat and prevent the scorching and crusting the stew on the pan at the margin of the surface of the stew, common in such cookers heated by direct action of the fire.

It also consists of the cock for turning the gas on and off, connected with one of the trunnions of the pan, so as to be automatically operated by the turning of the pan to increase and reduce the fire according as the pan is on or off the fire; and it also consists of a three-way cock and a separate lighting-jet device as a better means of controlling the fire when the pan is turned on and off than the simple one-way cock and the main burner, all as hereinafter fully described, reference being made to the accompanying drawings, in which—

Figure 1:
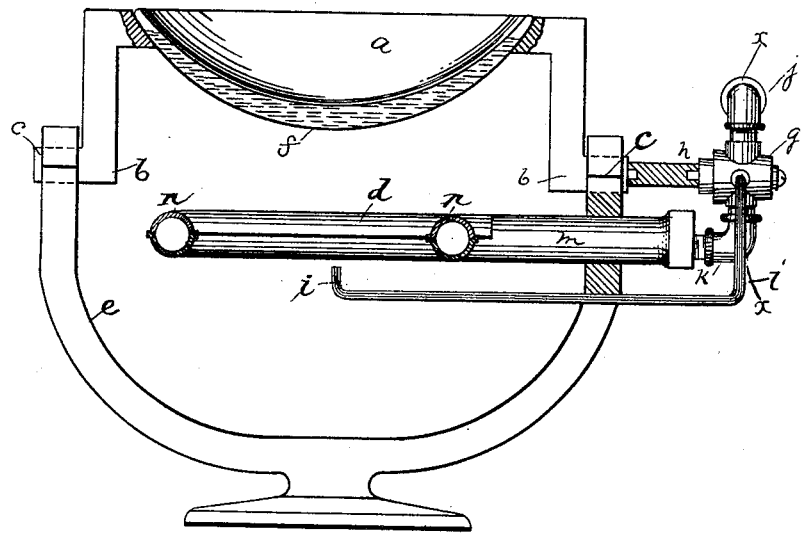
Figure 2:
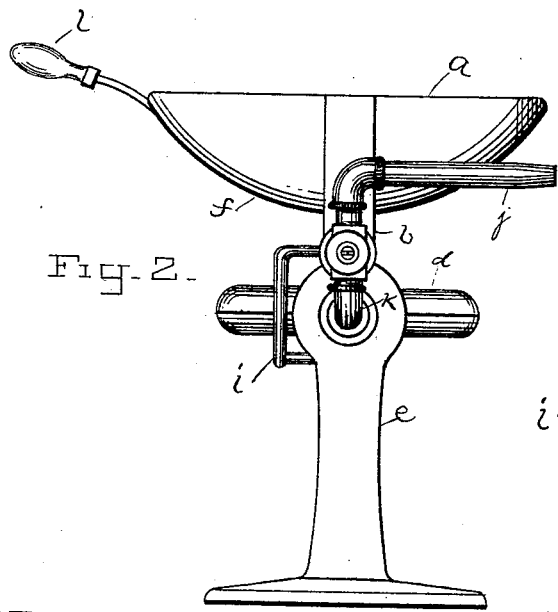
Figure 3:
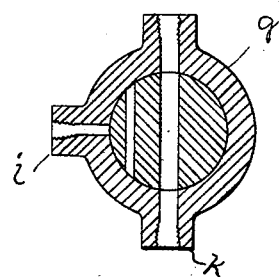

Figure 1 is a transverse section of the pan and burner below for heating said pan, and a side elevation of the rest of the apparatus. Fig. 2 is a side elevation of the whole apparatus as seen in a plane at right angles to that of Fig. 1; and Fig. 3 is a section of the three-way cock on line $x$ $x$, Fig. 1.

The pan $a$ is mounted on cranked trunnions $b$, supported in bearings $c$ of a stand $e$, over the ring-burner tube $d$, and has a handle $l$ for turning it to dump out the contents and to shift it to a position out of range of the flame while not in use, it being the function of the cranked arrangement to accomplish the latter purpose.

$f$ represents a jacket which I apply to the under side of the pan, and I charge the same with oil, preferably, but may employ any other liquid of high boiling temperature, and close the filling-inlet to permit the pan to be dumped without loss of the contents of the jacket, and thus provide such a dumping-pan with an equalizer of the heat which prevents the scorching and caking of the stew-liquids on the pan around the margin of the surface, so common in the pans exposed directly to the fire, and which is very objectionable.

In charging the jacket I leave a little free space for room to allow the liquid to expand, as it must to some extent by heat; but it is not necessary to provide for steam, because with a liquid of high boiling temperature steam will not be generated in the short time the pan is exposed to the flame in each operation, and because the pan is removed from the flame and allowed to cool when not in use. In the common arrangement of gas-heating burners the cock in the gas-pipe that supplies the gas to the burner has to be turned by hand to reduce the flame for economizing gas while the cooking is suspended, and it is often neglected and much waste of gas results.

I propose to take advantage of my dumping-pan device for automatically reducing the gas-supply, and therefore arrange this cock $g$ with its axis in the axis of the trunnions of the pan, as shown, and connect it with one of said trunnions by a wabbler-coupling $h$ to be thus automatically operated thereby. To turn off the gas when the pan is dumped and turn it on when the pan is returned over the fire and to prevent the flame being wholly extinguished, I will arrange it so that the cock will not quite close the passage, but will allow a sufficient flow to maintain a small flame for renewal of the maximum flame when the pan is returned to its position over the fire; but as the large burner necessary to the maximum flame is not favorable for so small a flame as is only necessary on renewal, I prefer to use a three-way cock $g$, with a lighting-branch $i$, that is turned on when the other is turned off, thus making it feasible to economize the gas to a greater extent, because such a lighting-jet of only one small flame will be equally as serviceable for lighting as the most reduced flame that can be retained in the main burner, but which is at best very much larger than the lighting-jet. By so connecting the cock with the pan it is positively operative in unison with the operations of the pan without care and trouble, and insures considerable economy of gas.

*j* represents the supply-pipe for the gas, which I have represented in the proper form for connecting a flexible pipe. *k* is the branch leading to the neck *m* of the burner *d*.

It is to be understood that the burner-tube *d* has numerous burner-tissues, as *n*, for producing a ring of flame.

I claim as my invention—

1. The improved cooking device consisting of the stand having the journal-bearings, the cranked trunnions mounted thereon, the stew-pan mounted on the said trunnions, and the gas-burner under the stew-pan, substantially as described.

2. The combination, with a pivoted dumping stew-pan, of a closed jacket charged with a heat-equalizing liquid and retaining said liquid when dumped.

3. The combination, in an oyster-cooker, of the pivoted dumping stew-pan, the closed jacket charged with a heat-equalizing liquid, and the gas-burner for heating the jacketed pan, said jacket retaining the equalizing-liquid when dumped.

4. The combination of the pivoted dumping stew-pan, the gas-burning heater for the pan, and the stop-cock of the burner supply-pipe coupled with the trunnion of the stew-pan and automatically operative thereby to control the fire.

5. The combination of the pivoted dumping stew-pan, the gas-burning heater for the pan, the auxiliary lighting-jet, and the three-way stop-cock of the burner supply-pipe coupled with the trunnion of the stew-pan and automatically operative thereby to shut off the heating-burner and let on the lighting-jet, and vice versa, as the stew-pan is dumped and replaced.

In testimony that I claim the foregoing as my invention I have signed my name, in presence of two witnesses, this 9th day of December, 1889.

ALBERT J. DOTY.

Witnesses:
WILFRED B. EARLL,
W. J. MORGAN.

It is hereby certified that in Letters Patent No. 434,822, granted August 19, 1890, upon the application of Albert J. Doty, of New York, N. Y., for an improvement in "Oyster-Cookers," an error appears in the printed specification requiring correction as follows: In line 11, page 2, the compound word "burner-tissues" should read *burner-issues;* and that the said Letters Patent should be read with this correction therein that the same may conform to the record of the case in the Patent Office.

Signed, countersigned, and sealed this 26th day of August, A. D. 1890.

[SEAL.] GEO. CHANDLER,
*First Assistant Secretary of the Interior.*

Countersigned:
 ROBERT J. FISHER,
  *Acting Commissioner of Patents.*